United States Patent

[11] 3,617,883

| [72] | Inventor | Donald Richman |
| | | Flushing, N.Y. |
| [21] | Appl. No. | 280,456 |
| [22] | Filed | Apr. 4, 1952 |
| [45] | Patented | Nov. 2, 1971 |
| [73] | Assignee | Hazeltine Research, Inc. |
| | | Chicago, Ill. |

[54] SPECTRUM-ANALYZING SYSTEM
7 Claims, 4 Drawing Figs.

[52] U.S. Cl. .................................................. 324/77 C,
315/12, 315/13 ST
[51] Int. Cl. ........................................................ G01r 23/14
[50] Field of Search ............................................ 250/20.41
P; 175/183, 11.2; 324/77

[56] References Cited
UNITED STATES PATENTS

| 1,953,918 | 4/1934 | Bellamy ........................... | 178/22 |
| 2,403,986 | 7/1946 | Lacy ................................ | 324/77 X |
| 2,425,003 | 8/1947 | Potter .............................. | 324/77 X |
| 2,570,858 | 10/1951 | Rajchman ....................... | 324/77 |
| 2,602,836 | 7/1952 | Foster et al. .................... | 324/77 |

OTHER REFERENCES

Mathes et al. The Cathode-Ray Sound Spectroscope; Journal of the Acoustical Society of America, Vol. 21 No. 5 (September 1949) pages 527– 537 Photo. in 324– 77.

*Primary Examiner*—Rodney D. Bennett, Jr.
*Attorney*—Laurence B. Dodds

CLAIM: 1. A spectrum-analyzing system comprising: a circuit for supplying the signals in a predetermined frequency spectrum; a plurality of signal-storage devices; means for causing said devices individually to be responsive to said supplied signals during different groups of recurrent intervals having durations longer than the interludes therebetween for individually storing effects representative of those of said supplied signals occuring during different ones of said groups of intervals, said groups of intervals being staggered in time and partially overlapping to diminish aperture distortion in the storing of said effects; a signal-deriving apparatus coupled to said storage devices; means for causing said deriving apparatus to be sequentially responsive to said stored effects at times corresponding to said interludes for deriving during each interlude from the effects stored in one of said intervals and at a rate higher than the storing rate thereof a plurality of groups of signals, each derived group being representative of those of said supplied signals occurring during said one interval; and signal-selecting means coupled to said deriving device and including a network having a pass band narrow relative to the frequency range of each of said groups of derived signals for sequentially developing signals each having the frequency limits of said network and individually representative of different frequency bands of said groups of derived signals.

FIG.4

SPECTRUM-ANALYZING SYSTEM

GENERAL

The present invention is directed to spectrum-analyzing systems for determining the signals occurring in a number of channels in a predetermined frequency spectrum. Specifically, in such systems the signals in a relatively wide frequency spectrum are simultaneously detected and the signals in a plurality of channels in such spectrum are effectively simultaneously resolved. Although the invention is subject to a wide variety of applications, it is especially suited for inclusion in a monitoring or guard receiver for military intelligence purposes to ascertain the presence of enemy transmissions in a plurality of channels in a frequency spectrum, and will, therefore, be described in that environment.

Spectrum analyzers or guard receivers are commonly employed as searching and intercepting means for unknown radio transmissions to detect such transmissions for the purpose of obtaining knowledge of their presence or of the intelligence being transmitted. Such receivers may then be utilized effectively to control direction-finding apparatus, thereby geographically to locate the unknown transmitter. Since these unknown transmissions may occur at any time, may occupy substantially any portion of the radiofrequency spectrum, and be of any desired duration, the problem of intercepting any single one or any large percentage of the unknown transmissions is a complicated one. This problem is made even more complex when an unknown transmitter operates for very short transmission periods having durations of less than one second, and utilizes a radiofrequency wave signal having different frequencies at different times to convey information to a receiver coordinated with the transmitter.

One of two conventional spectrum-analyzing systems has generally been utilized to effect such interceptions. The first of these systems is the result of a direct and unimaginative answer to the above-discussed problem. This system employs a number of receivers each of which is conventional in design and individual ones of which are tuned to different ones of the radiofrequency channels which the unknown transmitter may utilize. Since the number of possible channels available for utilization is quite large, for example, when a channel of approximately 1 kilocycle is used, it is apparent that this solution is undesirable, uneconomical, and may even be impractical. For example, if it is desired to resolve the transmissions occurring in every kilocycle channel in a frequency spectrum one megacycle wide, 1,000 receivers and probably 1,000 operators would be required.

Because of the limitations of the system just described, another type of spectrum-analyzing system has been utilized. This system operates on a time-sharing theory, utilizing a single receiver having a single tunable radiofrequency stage with a tuned pass band having a width equal to that of a channel. The tunable stage is systematically tuned in a sequential manner to each channel of interest in the frequency spectrum under observation. Thus, the receiver is responsive at different times to each of the channels of interest. Stated in another way, the receiver is responsive to the signals in any one channel only a fraction of the total reception time, the fraction being determined by the number of channels in the frequency spectrum to be analyzed. Such receivers are unable to guard all of the channels all of the time. As a result, such a receiver is effectively blind or unresponsive to any one channel a large proportion of the time, and, therefore, the receiver is capable of intercepting only a small fraction of the possible signals in any one channel. As a practical example, if very short duration transmissions of the order of one second or less are utilized by the unknown transmitter, it is possible that none of these transmissions may be intercepted by the receiver. In view of this serious limitation the second system is also undesirable.

It is desirable that a spectrum-analyzing system be relatively simple and economical in initial cost, in operation, and in the number of operators required and that it be substantially continuously and simultaneously responsive to all of the signals in a frequency spectrum while also being capable of resolving such signals to any desired degree. The present invention is directed to such a system.

It is an object of the present invention, therefore, to provide a new and improved spectrum-analyzing system which avoids one or more of the above-mentioned limitations of prior systems.

It is another object of the invention to provide a new and improved spectrum-analyzing system which utilizes a minimum of equipment to analyze with a high degree of resolution the signals in a relatively wide frequency spectrum.

In accordance with the invention, a spectrum-analyzing system comprises a circuit for supplying all signals in a predetermined frequency spectrum and a first signal-storage device responsive during recurrent intervals to these signals for storing in a predetermined, portion of each of the recurrent intervals first effects representative of those of the supplied signals occurring during the aforesaid portion of each of the recurrent intervals. The system also includes a second signal-storage device responsive to the supplied signals during intervals intervening the recurrent intervals for storing in a portion of each of the intervening intervals other effects representative of those of the supplied signals occurring during the aforesaid portions of each of the intervening intervals. The system also comprises a signal-deriving apparatus coupled to the first and second signal-storage devices and responsive to the above-mentioned first effects during the intervening intervals and to the other effects during the recurrent intervals for deriving therefrom in a fraction of the portions of the recurrent and intervening intervals signals representative of the supplied signals. In addition, the system comprises a signal-selecting network coupled to the deriving device and including at least one filter network having a pass band narrow relative to the frequency range of the derived signals for translating a band thereof representative of a band of the supplied signals, thereby to determine the signals in a selected frequency band thereof.

For a better understanding of the present invention, together with other and further objects thereof, reference is had to the following description taken in connection with the accompanying drawings, and its scope will be pointed out in the appended claims.

Figure 1:
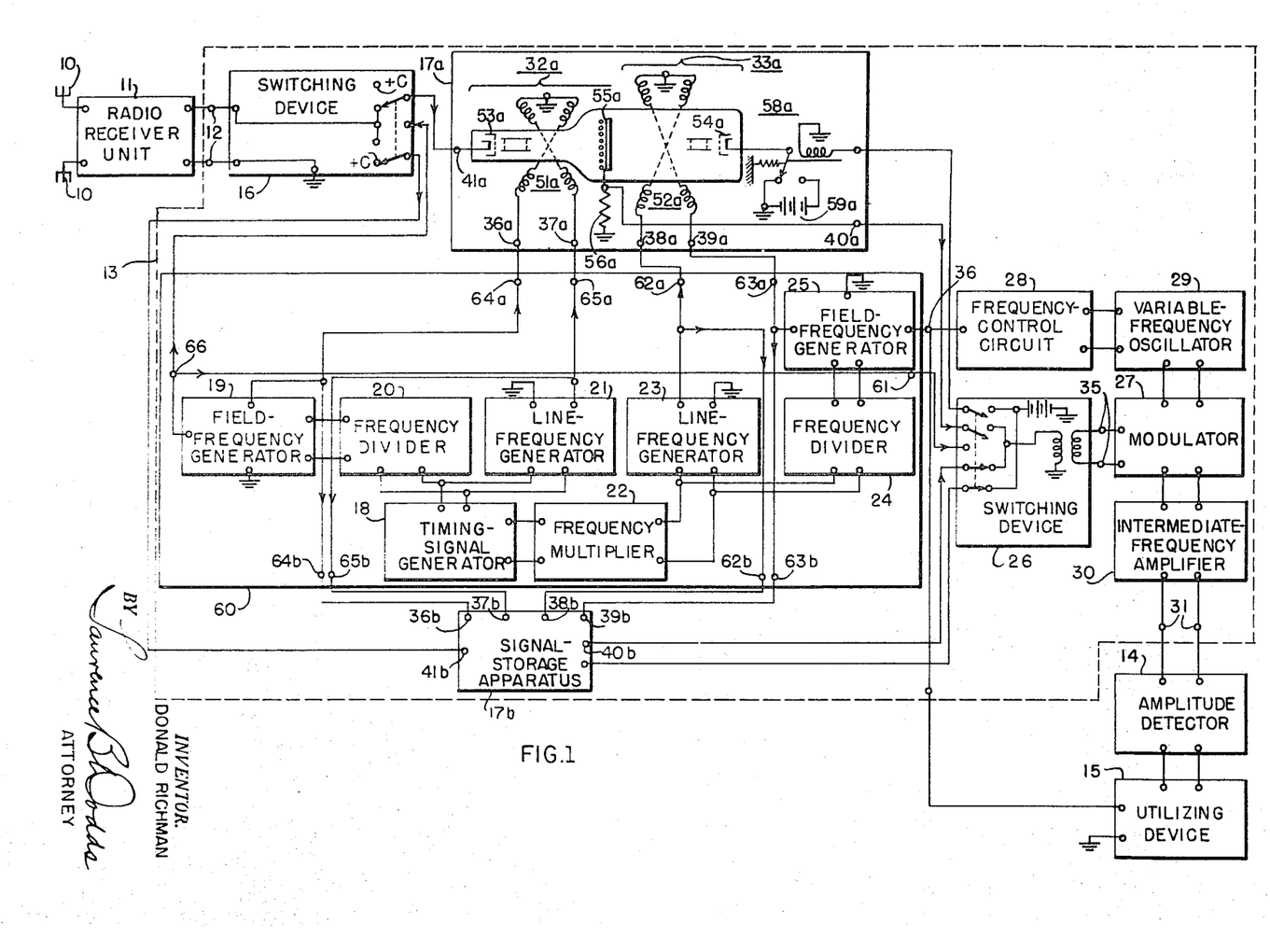
FIG. 1 is a schematic diagram of a complete panoramic radio receiver embodying one form of the spectrum-analyzing system in accordance with the present invention.

General Description of Receiver of FIG. 1

Referring now, more specifically, to the panoramic radio receiver of FIG. 1, this receiver includes a radio receiver unit 11 having an antenna system 10,10 coupled to the input circuit thereof and, coupled in cascade with the output circuit thereof, in the order mentioned, a spectrum-analyzing system 13 in accordance with the present invention as will be described more fully hereinafter, a conventional amplitude detector 14 and a utilizing device 15. The radio receiver unit 11 may include a radiofrequency amplifier of one or more stages, an oscillator modulator and an intermediate-frequency amplifier of one or more stages and effectively have any desired pass band. For example, the unit 11 may effectively have a pass band of 200 kilocycles, the radiofrequency amplifier being responsive to signals of any desired radiofrequency and having a pass band of 200 kilocycles and the intermediate-frequency amplifier being designed to operate at relatively low intermediate frequencies, for example, having a pass band of 10–210 kilocycles. In general, the spectrum-analyzing system 13 comprises a system for storing energy representative of the signals translated by the unit 11 and for analyzing such stored energy effectively to resolve the intercepted signals to any desired degree, for example, to resolve the signals in the 200-kilocycle pass band into the signals in each 1-kilocycle channel within the pass band. Such resolution permits the information in each of the 1-kilocycle channels in such frequency spectrum to be derived. The utilizing device 15 may comprise an indicating system for the detected signals, for example, a cathode-ray tube, a loudspeaker or a control system for alerting direction-finding equipment to ascertain the position of an unknown transmitter. Such utilizing devices are conventional and need not be described or explained in detail herein.

Since the major portion of the receiver of FIG. 1 is the spectrum-analyzing system 13, the operation of the receiver as a whole will be explained after the description of the system 13 has been presented.

Description of Spectrum-analyzing System of FIG. 1

Referring now, specifically, to the spectrum-analyzing system 13 of FIG. 1, this system comprises a circuit for supplying all signals in a predetermined frequency spectrum, specifically, a switching device 16 having an input circuit coupled through a pair of terminals 12,12 to the output circuit of the radio receiver unit 11. The device 16 comprises a pair of high-speed two-position switches as diagrammatically represented and may be a conventional electronic switch. Effectively the movable arms of different ones of the pair of switches are individual coupled to terminals 41a and 41b of similar signal-storage apparatus 17a and 17b, respectively. One switch position of each switch is coupled to the input circuit of the device 16, the other switch position of each switch being connected to the source of bias potential +C and the switches are so coupled together that the movable arm of one is connected to the source of potential +C when the movable arm of the other is coupled to the input circuit of the device 16. Duplicate apparatus 17a and 17b are employed to permit effects representative of signals continuously to be stored and stored effects continuously to be analyzed, one of these apparatus performing a storing function while the other thereof is deriving signals from the effects previously stored therein. In view of the fact that except for differences in the time of operation, these apparatus are the same, only the apparatus 17a will be described in detail hereinafter.

The spectrum-analyzing system also comprises a first signal-storage device, specifically part of the signal-storage apparatus 17a, responsive during recurrent intervals to the signals translated through the switching device 16 for storing, in a predetermined portion of each of the recurrent intervals, first effects representative of those of the supplied signals occurring during the aforesaid portion of each of the recurrent intervals. Thus, the apparatus 17a includes a storage device 32a. The spectrum-analyzing system also comprises a signal-deriving device, specifically portion 33a of apparatus 17a, responsive during intervals intervening the recurrent intervals to the first effects for deriving therefrom, in a fraction of the above-mentioned portion of each of the recurrent intervals, signals representative of the signals translated through the switching device 16.

The apparatus 17a may be a conventional storage-type cathode-ray tube, for example, a tube of the type more fully described in an article entitled "The Graphechon — A Picture Tube" in the RCA Review for Mar., 1949, pgs. 59–73, inclusive, such tube having a plurality of electrodes, including a plurality of cathodes 53a and 54a each of which is effective to develop an electron beam, and an anode 55a which is effectively a plurality of condensers. The cathode 53a is normally biased to cutoff, this bias being removed by the operation of the device 16 to couple the unit 11 to the cathode 53a. The cathode 54a is connected through a springloaded, magnetically operated two-position switch 58a to either the positive or negative terminal of a battery 59a, the positive terminal being connected to chassis ground. The inductor for controlling the positioning of the movable contact of the switch 58a is coupled to a terminal of a switching device 26, the cathode 54a being biased to cutoff when the movable member is connected to the positive terminal of the battery 59a and tending to conduct when the member is connected to the negative terminal of the battery 59a. The details of the device 26 will be described more fully hereinafter. The anode 55a conventionally comprises a sheet of metal, more specifically, a thin sheet of aluminum through which electrons may pass supported by a wide mesh grid, upon which is deposited a film of insulating material of minute thickness. The insulating material in combination with the metal sheet effectively forms a condenser in which the metal sheet is one electrode and the surface of the dielectric material remote from the metal sheet is effectively the other electrode. If this condenser is charged so that a uniform potential is developed over the area of the anode and between the remote surface of the dielectric material and the metal sheet, since the dielectric material has effectively infinite resistance transversely thereof, an electron beam passing through the metal sheet toward the dielectric surface is effective independently to discharge portions of the condenser having areas substantially equal to the cross-sectional area of the beam. The amount of discharge in each area will be related to the intensity of the electron beam impinging on the area. Thus, it may be said that the anode effectively comprises a plurality of condensers. As explained in the aforementioned article, the discharging operation is a recently discovered phenomenon which is observable in films thin enough to be wholly penetrated by an electron beam.

The apparatus including such a tube also comprises a beam-deflection means 51a for causing the electron beam developed by the cathode 53a to scan one surface of the anode 55a at a predetermined rate to develop effects on the anode 55a, specifically, to develop in individual ones of the aforementioned condensers effects representative of the translated signals applied to the terminal 41a. The apparatus 17a also includes another beam-deflection means 52a for causing the beam emitted by the cathode 54a to scan the opposite surface of the anode 55a at a rate much higher than the scanning rate of the beam emitted by the cathode 53a to derive from the stored effects on the anode 55a signals representative of the translated signals. The anode 55a has coupled thereto an anode load resistor 56a and the latter is coupled through a terminal 40a to an input circuit of a switching device 26.

The unit 17b is a second signal-storage device responsive to the supplied signals during the aforesaid intervening intervals for storing in a portion of each of the intervening intervals other effects representative of those of the supplied signals occurring during the aforesaid portions of each of the intervening intervals. As in the unit 17a, the device 17b also includes a portion thereof responsive during the recurrent intervals to the other effects for deriving therefrom, in a fraction of the above-mentioned portion of each of the intervening intervals, signals representative of the signals translated through the switching device 16.

The portion 33a of the apparatus 17a and the corresponding portion of the apparatus 17b comprise signal-deriving apparatus coupled to the first and second signal-storage devices 17a and 17b and responsive to the first effects during the intervening intervals and to the other effects during the recurrent intervals for deriving therefrom in a fraction of the portions of the recurrent and the intervening intervals signals representative of the signals supplied by the units 11 and 16.

The system 13 also comprises control apparatus 60 including timing and signal-developing devices for developing scanning potentials for application to the deflection windings 51a and 52a. Specifically, the apparatus 60 comprises a timing-signal generator 18 which may be a conventional blocking oscillator having one output circuit coupled through a line-frequency generator 21 and a terminal 37a to the line-deflection winding of the deflection windings 51a, and coupled through a frequency divider 20, a field-frequency generator 19 and a terminal 36a to the field-deflection winding of the deflection windings 51a. An output circuit of the field-frequency generator 19 is also coupled to input circuits of the switching device 16 and of the similar device 26, to be considered more fully hereinafter, for controlling the switch conditions thereof. The frequency divider 20 may be of a conventional type for developing a control signal for the field-frequency generator 19 so that the field-frequency signal applied to the deflection windings 51a is subharmonically related to the line-frequency signal applied thereto.

The apparatus 60 also comprises, coupled in cascade to another output circuit of the timing-signal generator 18, a frequency multiplier 22 and a line-frequency generator 23 the output circuit of which is connected through a terminal 38a to the line-deflection winding of the deflection windings 52a. The output circuit of the frequency multiplier 22 is also coupled through a frequency divider 24, a field-frequency generator 25 and a terminal 39a to the field-deflection winding of the windings 52a. An output circuit of the field-frequency generator 25 is coupled through a terminal 36 to an input circuit of a frequency-control circuit 28, and to an input circuit of the utilizing device 15 if the device 15 is of the cathode-ray tube type and requires synchronizing of the scanning of the image screen thereof with at least one of the scansions of the screens of the storage device 17a. The frequency multiplier 22 may be of conventional construction and is effective to develop a signal the frequency of which is harmonically related to the frequency of the basic timing signal so that both the line-scanning and field-scanning rates of the electron beam emitted from the cathode 54a are higher than the related scanning rates of the beam emitted from the cathode 53a.

The spectrum-analyzing system also comprises a signal-selecting network coupled to the anode 55a of unit 17a and including at least one filter network having a pass band narrow relative to the frequency range of the derived signals for translating a band of the derived signals representative of a band of the translated signals, thereby to determine the signals in a selected frequency band thereof. Specifically, the signal-selecting network comprises, in cascade, the switching device 26, a modulator 27, and an intermediate frequency amplifier 30 which comprises a filter network having the aforesaid pass band and the output circuit of which is coupled through a pair of terminals 31,31 to the amplitude detector 14. The signal-selecting network also includes the frequency control circuit 28 and a variable-frequency oscillator 29 connected in cascade, the output circuit of the oscillator being coupled to an input circuit of the modulator 27. The switching device 26 is diagrammatically represented and effectively comprises a pair of double-pole, single-throw switches. Such a device may be a conventional electronic switching device, the pair of switches being similarly connected in their respective circuits, individually to control the coupling to the output circuits of the units 17a and 17b. The pair of switches are coupled together so that one switch is in closed-circuit position while the other is in an open-circuit position. Considering the details of the switch connected to the unit 17a, one of the movable arms thereof is connected to the terminal 40a and, when in closed-circuit position, to the output circuit of the device 26. The other movable arm is coupled to the inductor of the switch 58a and, when in closed-circuit position, to a battery for energizing the switch 58a. Similar connections are made from the unit 17b to the movable arms of the other switch and to the output circuit of the device 26 and the energizing battery within the device 26. The device 26 is controlled, as will be explained more fully hereinafter, so as to operate in synchronism with the device 16, but to couple the output circuit of one of the units 17a, 17b to the modulator 27 when the input circuit of the other one of the units 17a, 17b is coupled through the switch 16 to the unit 11. The units 27–30, inclusive, may be of any conventional type, the unit 28 comprising, for example, a reactance tube for controlling the frequency of the oscillator 29. The pass band of the unit 30 will ordinarily be approximately equal to the pass band of the unit 11.

Explanation of Operation of Receiver of FIG. 1

Before considering the operation of the receiver of FIG. 1 and, specifically, the unit 13 thereof, it will be helpful generally to consider the communication theory upon which the present invention is founded. It is well understood that any signal existing for a time $t$ may be defined in terms of a Fourier series. More specifically, such Fourier series determines that a signal having a bandwidth of $W$ cycles per second and a duration of $t$ will have $tW$ sine terms and $tW$ cosine terms, each of these terms being capable of conveying signal information. Thus, the total number $K$ of independent information bearing terms or basic units into which the signal is resolvable is defined as follows:

$K=2tW$ (1) One form of mathematical proof of the accuracy of an equation such as equation (1) is presented in an article entitled "Communication in the Presence of Noise," by Claude E. Shannon in the Proceedings of the IRE for Jan. 1949, pgs. 10–21, inclusive.

Equation (1) can be graphically represented in terms of frequency-time ($tW$) coordinates, a unit area in such a graph being proportional to a resolvable unit for the signal under consideration. Thus, the total number of resolvable units for such signal is represented by the total number of unit areas in the graph. It logically follows then, that if the number of resolvable units $K$ in a given signal is defined by the product of frequency and time, all values of frequency and time which result in the same product $K$ include the same number of resolvable units. Thus, referring to equation (1), if the time $t$ is shortened to a time $t/c$ where $c$ is an arbitrarily selected constant, then the bandwidth $W$ should become $Wc$ if the same number of resolvable units is to be available. This relationship may be mathematically expressed as follows:

$K=2(t/c)Wc$ (2) The present invention is based on the relationship expressed by equation (2).

The more accurate expression "cycles per second" has been employed above with relation to the bandwidth $W$, and other discussions relating to the frequency of a signal. Hereinafter for simplicity of expression the shorter and more conventional term "cycles" will be employed to express similar concepts.

Figure 2:
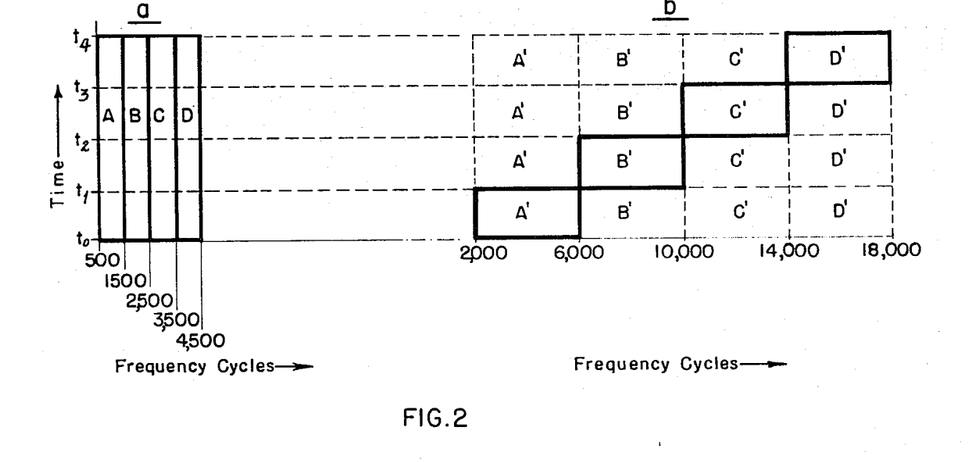
FIGS. 2a and 2b are graphs useful in explaining the system of FIG. 1.

The practical utilization of the above-discussed information theory in the teachings of the present invention may best be understood by first considering how a group of audio signals individually having frequencies of 1,000, 2,000, 3,000, and 4,000 cycles and thus representing 4 resolvable units which may be resolved when these signals have been recorded on a tape or other recording medium as a composite signal having a bandwidth of 500–4,500 cycles. The composite audio signal recorded for a time $t_4$ has a frequency-time characteristic as represented by FIG. 2a wherein the 1,000, 2,000, 3,000, and 4,000 cycle signals occur in channels A, B, C, and D, respectively. The area defined by the product of $t_4$ times 4,000 is the resolvable unit area in cycles for the composite audio signal while the areas for the channels A–D, inclusive, defined by the products of $t_4$ times 1,000 are at least the resolvable unit areas for the 1,000, 2,000, 3,000, and 4,000 cycles per second signals, respectively.

If it is desired to analyze the composite signal in terms of the signals which appear in the frequency bands or channels A, B, C, and D, performing that analysis in a time equal to the initial recording time, the theory expressed by equation (2) may be employed. The tape may be played back at four times the recording rate thereby making $c$ in equation (2) equal to four. This will multiply the recorded frequencies by four but it will also mean that the complete recording can be played back in one-quarter of the recording time. If then the tape is played back at four times the recording rate, as represented in FIG. 2b, and a filter network having a pass band of 2–6 kilocycles is coupled thereto during the first play-back period, all of the signals in the channel A occurring at four times the fundamental frequency will appear in the channel A' and will be translated through the pass band. It is apparent that all of the signals in the original channel A have been resolved in one-quarter of the time it took to make the initial recording. In a similar manner, the signals in channels B, C, and D, by the use of suitable pass bands, may be resolved, the total resolution operation requiring no more time than was initially required to make the recording. The composite audio signal 500 – 4,500 cycles is thus effectively resolved into the 1,000, 2,000, 3,000, and 4,000 cycle components appearing in the channels A, B, C, and D, respectively. If desired, the same 2–6 kilocycle pass band may be utilized for all of the signals, an oscillator being varied in frequency to develop a signal which heterodynes with the desired audio signals in a predetermined order to develop 2–6 kilocycle resultant signals which are then translated through the 2–6 kilocycle band-pass filter just discussed.

The example just considered demonstrates that the signals occurring in a wide frequency spectrum may be stored and then resolved to any desired degree without loss of time by means of a resolving system operating at a rate higher than that of the storing system, and that the degree of resolution determines the ratio of the storing and resolving rates. For example, as was discussed with relation to the composite audio signal, when it is desired to resolve such a composite signal into the signals in four channels, A, B, C, and D, the resolving system is operated at four times the rate of the storing system.

Before considering the details of the operation of the panoramic radio receiver of FIG. 1, it will be helpful to discuss the operation of the circuit 60 in developing the sawtooth scanning waves utilized by the deflection windings in the units 17a and 17b. The timing-signal generator 18 develops, in a conventional manner, pulses of potential having a predetermined recurrence rate, for example, at a rate equal to the desired frequency of the sawtooth scanning waves developed in the line-frequency generator 21, these pulses determining the frequency of these sawtooth waves in a conventional manner. A signal which is a subharmonic of the signal developed in the generator 18 is developed in the output circuit of the frequency divider 20 and determines the field frequency of the unit 19 in a conventional manner. The signals developed in the units 19 and 21 control the line scanning and field scanning of the beam emitted from the cathode 53a of the unit 17a and of a corresponding beam in the unit 17b. In a manner similar to that just discussed, through the scanning frequencies developed are much higher than those developed in the units 19 and 21 as will be explained more fully hereinafter, line-frequency and field-frequency signals are developed in the units 23 and 25, respectively, to control the line and field scanning of the electron beam emitted by the cathode 54a of the unit 17a and of a corresponding beam in the unit 17b.

Considering now the operation of the panoramic radio receiver of FIG. 1, signals in a spectrum of, for example, 200 kilocycles at a desired radiofrequency are translated through a portion of the unit 11 and converted therein to intermediate-frequency signals having frequencies in the range of, for example, 10–210 kilocycles. The latter signals are applied through the terminals 12,12 to the system 13 to be resolved in terms of the signals in the two hundred 1-kilocycle channels in the spectrum by operating the resolving system at 200 times the rate of the storing system. In the spectrum-analyzing system 13 the 10–210 kilocycle signals are translated through the switching device 16 and, during one storage period, translated through the terminal 41a and effects representative thereof stored on the anode 55a by means of the electron beam emitted from the cathode 53a as it is caused to scan the anode 55a. As stated previously, when the device 16 couples the unit 11 to the cathode 53a, the latter cathode emits electrons which flow to the anode 55a. During this period, the corresponding cathode in the unit 17b is biased to cutoff by the device 16 and the cathode 54a, through the operation of the device 26 controlling the switch 58a, is also biased to cutoff. The cathode in the unit 17b, which corresponds to the cathode 54a, emits electrons, and effects previously stored on the anode in the unit 17b are analyzed by the scanning of the latter anode by the beam emitted from the last-mentioned cathode of the unit 17b.

The storing speed or the scanning rate of the electron beam emitted from the cathode 53a of the unit 17a is related to the degree of resolution required and to the cross-sectional area of the beam since this area determines the size of the storage elements or condensers of the anode 55a. More specifically, the electron beam should remain in contact with any one storage element for a period sufficiently long to store at least one unit of information, in other words, for a time equal to one-half the duration of one cycle of a signal having a frequency equal to the frequency range of the band of signals being analyzed. Equation (1) indicates the need for a time of such duration. After one field of scan of the anode 55a, a flyback signal of conventional type developed in the generator 19 causes the switching device 16 to be decoupled from the unit 17a and coupled to the apparatus 17b, and the device 26 to be decoupled from the unit 17b and coupled to the unit 17a. As a result, the cathode 53a is biased to cutoff, the corresponding cathode in the unit 17b is caused to emit electrons and to cause electrical effects representative of the signals translated through the unit 11 to be stored on the anode of the unit 17b, the switch 58a is positioned under the control of the device 26 so that the cathode 54a is no longer below cutoff, and the cathode in the unit 17b which corresponds to the cathode 54a is caused to be biased to cutoff by the action of the device 26. Thus, for the next scanning period electrostatic effects representative of the translated signals are stored on the anode of the unit 17b, and the line-frequency generator 23 together with the field-frequency generator 25 through the medium of the deflection windings 52a cause the electron beam emitted by the cathode 54a to trace a pattern on the anode 55a. The latter scanning is effected at a rate higher than the scanning of the anode by the beam emitted by the cathode 53a. As stated previously, the rate of scanning of the beam with respect to the anode 55a is determined by the number of channels into which the band of signals is to be divided or, in other words, by the resolution desired. If it is desired that the signals in each 1-kilocycle channel of a 200-kilocycle spectrum be resolved, then the ratio of the scanning rates of the two beams will be 200:1.

During every field of scan of the anode 55a by the electron beam emitted from the cathode 54a, a group of signals is developed across the load resistor 56a and applied through the switching device 26 to the modulator 27. Due to the ratio of the scanning rates, in view of the relationship expressed by equation (2), these signals have frequencies two hundred times the frequencies of the signals originally translated through the device 16 and occupy a total pass band of 200 times the original 200-kilocycle pass band. Since it is desired to derive the signals in each 1-kilocycle channel, a group of signals having a bandwidth of 200 kilocycles and related to one of the 1-kilocycle channels in the 200-kilocycle pass band should be translated through the amplifier 30 for each field of scan by the electron beam emitted from the cathode 54a. This is effected by causing the frequency of the oscillator 29 continuously to vary so that the heterodyning of the oscillator signal and the signal applied to modulator 27 from the device 26 continuously develops a signal representative of one resolvable 1-kilocycle unit of the signal being analyzed, the developed signal having a bandwidth of 200 kilocycles because of the time-frequency transformation. The developed signal is translated through the amplifier 30 and represents, during different fields of scan by the beam emitted from the cathode 54a, signals in progressively different 1-kilocycle channels of the intercepted signal. The manner in which this result is effected will now be explained by means of an example.

If it is assumed that the signal intercepted by the antenna 10,10 has a 200-kilocycle spectrum having the frequency limits 600–800 kilocycles, the signal developed in the output circuit of the intermediate-frequency amplifier of the unit 11 has a 200-kilocycle spectrum having the frequency limits 10–210 kilocycles and the signal developed across the load resistor 56a has the frequency limits 10×200 to 210×200 kilocycles or 2–42 megacycles. The developed signal has a bandwidth of 40 megacycles and includes two hundred 200-kilocycle bands representative of the two hundred 1-kilocycle bands of the intercepted signal, for example, the bands 2,000–2,200 kilocycles, 2,200–2,400 kilocycles, ----- 41,800–42,000 kilocycles. If the amplifier 30 is proportioned to have a pass band of 50,000–50,200 kilocycles, then for the first band of signals the oscillator 29 should initially have a frequency of 52 megacycles and should gradually increase in frequency to have a final frequency of 92 megacycles for the final band. The rate of change of the frequency of the oscillator is determined by the field-scanning rate of the beam emitted from the cathode 54a, the oscillator varying in frequency by 200 kilocycles for each field of scan to develop a beat signal at all times which has a component in the range of 50,000–50,200 kilocycles. Oscillators of the type just described are conventional in panoramic receivers and ionosphere investigation equipment for continuously tuning transmitters and receivers through the wide spectrum of frequencies. By employing such an oscillator, the signals in the two hundred 200-kilocycle bands are sequentially translated through the amplifier 30 and any modulation signals thereof derived in the detector 14 for utilization in the device 15.

The frequency of the oscillator 29 is controlled by a signal developed in the generator 25 having a characteristic which represents the desired bands of signals. Preferably a sawtooth signal having a period related to the total storage or resolution time is developed in an output circuit of the generator 25 continuously to vary the frequency of the signal developed in the oscillator 29 at such a rate with relation to the field-scanning rate of the portion 33a that the signals in the two hundred 200-kilocycle bands are effectively sequentially translated through the amplifier 30 applied to the detector 14 wherein any modulation signals are derived and utilized in the device 15. As mentioned previously, such utilization may comprise display on the screen of a cathode-ray tube to indicate the presence or absence of intelligence information in any channel, energizing a loudspeaker for each channel to reproduce any intelligent sounds or the control of a system for alerting direction-finding equipment to ascertain the position of an unknown transmitter.

It should be understood that though the storage device 32a and the signal-deriving device 33a of the apparatus 17a have been represented and explained as part of the same tube or envelope and as utilizing a common anode 55a, these units may be separate within the teaching of the present invention. Thus, effects representative of intercepted signals may be stored on a storage medium and that storage medium physically or otherwise transported for coupling to a deriving device for deriving signals related to the effects stored thereon. Similarly, the rates of scan of the beams emitted by the cathodes 53a and 54a need not be related or controlled by a common timing means nor have similar scanning patterns. If dissimilar patterns are utilized, the correlation between the patterns may be so designed as to develop the desired information in the output circuit of the storage device, though such designs may result in the developing of null points in the spectrum being analyzed. These null points may result because the pattern utilized to analyze the stored effects effectively causes related signals which occur in the free spectrum at different times to be simultaneously analyzed. The phase characteristics of such related signals at the different times may be such that, when simultaneously analyzed, signal cancellation may occur causing a null to occur where signals should be developed. Nevertheless, since only a small percentage of such nulls will occur, if these can be tolerated, apparatus of the type previously described herein but utilizing dissimilar scanning patterns may be designed to cover a much wider spectrum than when similar scanning patterns are employed. Though some resolution is lost by utilizing such dissimilar patterns, this loss is more than compensated for by the wider spectrum which may be analyzed and the resolution will still be superior to the prior systems previously referred to herein. It should also be understood that, insofar as beam scanning is concerned, it is essential in practicing the present invention only that the rate of scan of the electron beam in the deriving device 33a be higher than the rate of scan of the electron beam in the storage device 32a by a factor related to the degree of resolution desired.

It is apparent that by means of the spectrum-analyzing system just described a panoramic receiver may substantially continuously and simultaneously intercept all of the signals of a wide frequency spectrum and resolve such signals to any desired degree without requiring undue complexity or duplication of receiver equipment. For example, by utilizing slightly more than the equivalent of the equipment in two conventional panoramic receivers, results equivalent to those obtainable from approximately 200 receivers may be attained.

Figure 3:
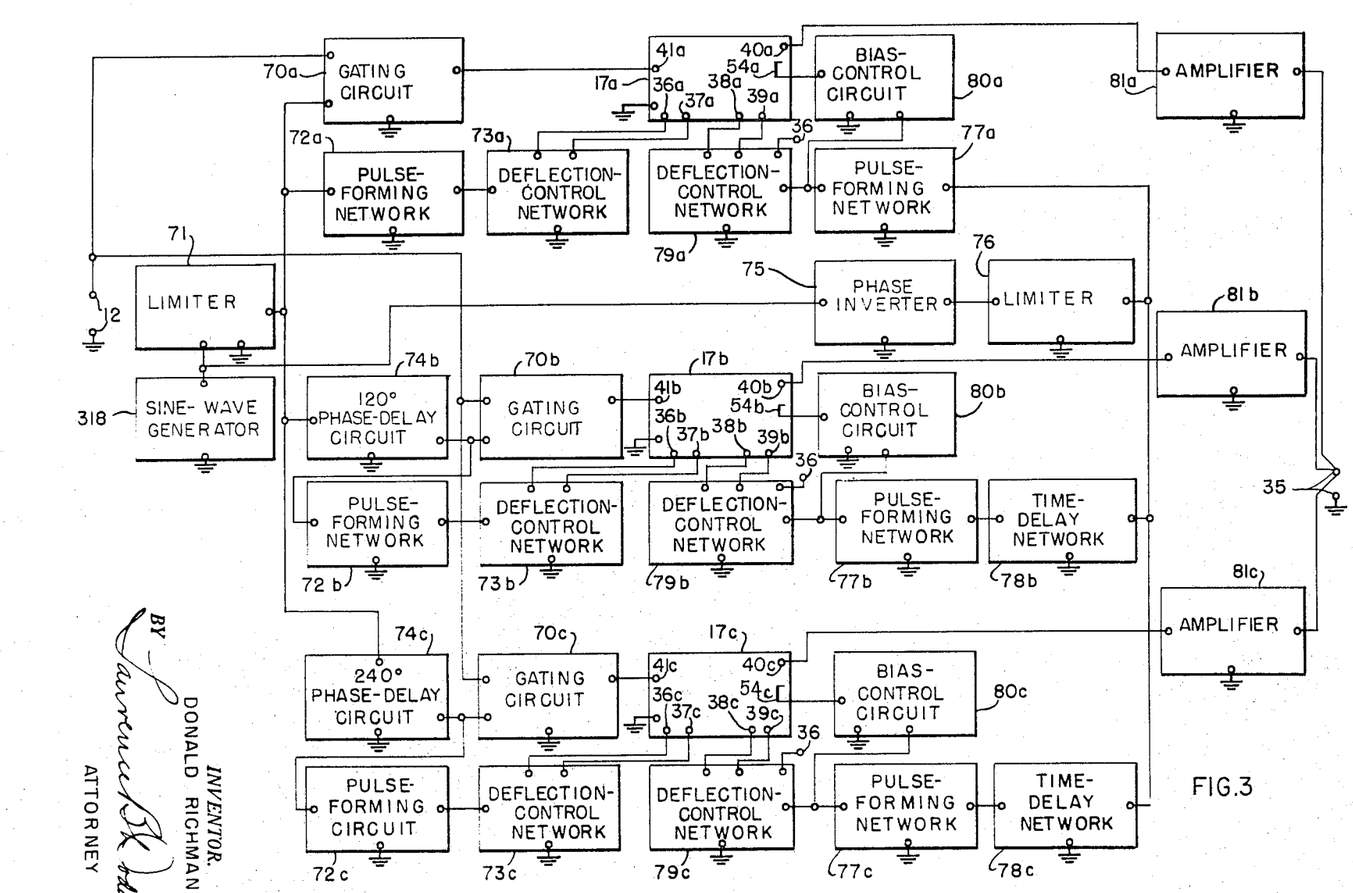
FIG. 3 is a schematic diagram of a modification of a portion of the system of FIG. 1.

Description of Spectrum-analyzing System of FIG. 3

In the system 13 of FIG. 1, because of the pulse type of switching by the switching device 16 alternately to couple the intercepted signals to the units 17a and 17b, the viewed by the storage devices therein through rectangular time apertures having sides of substantially infinite slope. When utilizing such apertures undesirable modulation effects of the signals passing therethrough tend to occur resulting in spurious information. In order to minimize these undesired results, apertures should have gradually changing slopes or, in other words, should have improved "skirt" selectivity. One of the more preferably apertures has a shape similar to the area under a half cycle of a sine or cosine curve. The spectrum-analyzing system represented by FIG. 3 utilizes apertures of the latter type.

The system of FIG. 3 is generally similar to that of FIG. 1 except that the system of FIG. 3 includes three instead of two signal-storage apparatus. Therefore, corresponding units in the systems of FIG. 1 and FIG. 3 are identified by the same reference characters while analogous units are identified in the system of FIG. 3 by the corresponding character in the system of FIG. 1 with a prefix of 3. Since, in the system of FIG. 3, three similar and related storage and deriving circuits, individually included in apparatus 17a, 17b, and 17c, are utilized, only one thereof will be described in detail. The terminals 12,12; 35,35 and 36 of FIG. 3 correspond to the similarly designated terminals of FIG. 1 and apparatus of the type connected to these terminals in FIG. 1 may be coupled to the corresponding terminals of FIG. 3 to form a complete receiver.

The input circuit of the apparatus 17a including the terminal 41a is coupled through a gating circuit 70a to one of the terminals 12,12. The gating circuit 70a is additionally coupled through a limiter 71 to the output circuit of a conventional sine-wave generator 318 and through a pulse-forming network 72a and a deflection-control network 72a to the terminals 36a and 37a in the unit 17a. The parameters of the generator 318 are proportioned to develop a signal having a period equal to the total signal-storing period of the units 17a–17c, inclusive. The output circuit of the limiter 71 is also connected through a phase-delay circuit 74b, proportioned to delay the phase of the signal applied thereto by 120°, to an input circuit of the gating circuit 70b and through a phase-delay circuit 74c, proportioned to delay the phase of the signal applied thereto by 240°, to an input circuit of the gating circuit 70c. The gating circuits 70a–70c, inclusive, are of a conventional type, being normally maintained nonconductive and being rendered conductive by the gating signals applied thereto from the limiter 71.

The sine-wave generator 318 is also coupled through a phase inverter 75 and a limiter 76 to individual input circuits of pulse-forming networks 77a, 77b and 77c, the coupling between the limiter 76 and the units 77b and 77c being made through time-delay networks 78b and 78c, respectively. The limiters 71 and 76 are conventional, the parameters of the limiter 71 being proportioned to translate an amplitude portion of the sine-wave signal developed in the unit 318, this portion having an amplitude approximately equal to two-thirds the peak-to-peak amplitude of the generated signal. The parameters of the limiter 76 are proportioned to translate the one-third portion of the signal not translated through the limiter 71 and after the signal is inverted in the unit 75. The time-delay networks 78b and 78c are proportioned to delay the pulses applied thereto by the duration of the pulse and twice this duration, respectively. The output circuit of the pulse-forming network 77a is coupled through a deflection control network 79a to the terminals 38a and 39a in the unit 17a and is also coupled through a bias-control circuit 80a to the cathode 54a of the device 17a. The circuit 80a and similar circuits 80b and 80c are proportioned to maintain the cathodes 54a–54c, inclusive, below anode-current cutoff and to overcome the bias on these cathodes upon the application of a pulse thereto.

The output circuits of the units 17a–17c, inclusive, are separately coupled through individual ones of the terminals 40a–40, inclusive, and of amplifiers 81a–81c, inclusive, to the terminals 35,35.

Explanation of Operation of the Spectrum-Analyzing System of FIG. 3

In general, except for the employment of three storage apparatus instead of two, and the utilization of curvilinear apertures instead of rectilinear ones, the system of FIG. 3 operates in a manner similar to the system of FIG. 1. In order more fully to understand the utilization of the curvilinear apertures, the system of FIG. 3 will now be described with reference to the curves of FIG. 4, these curves being amplitude-time representations of potentials developed at different points in the spectrum-analyzing system of FIG. 3.

Figure 4:
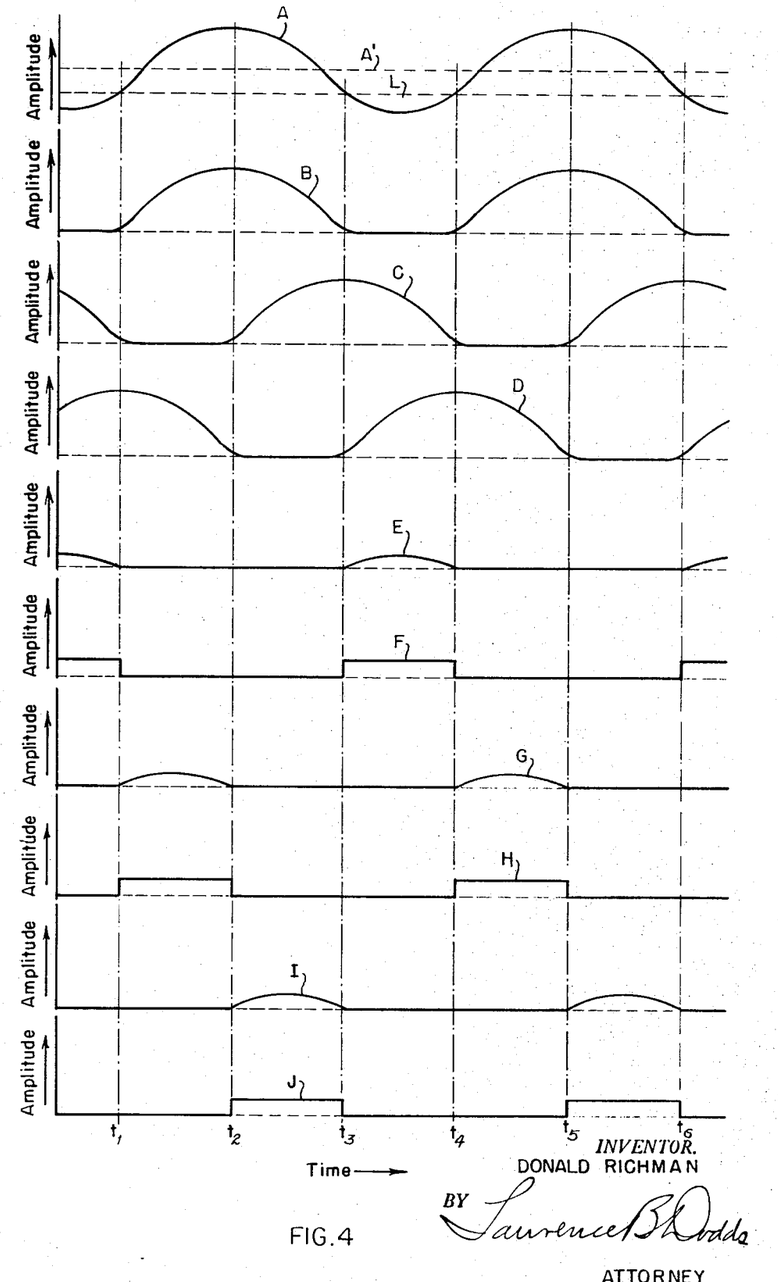
FIG. 4 is a graph useful in explaining the system of FIG. 3.

The sine-wave signal represented by curve A of FIG. 4, having an axis A', and having a frequency related to the desired gating frequency, is developed in a conventional manner in the generator 318. The fraction of the signal represented by the portion of curve A above the limiting level L is translated through the limiter 71 and applied to the gating circuit 70a as a signal having the form represented by curve B. Similarly, signals such as are represented by curves C and D are applied to the gating circuits 70b and 70c, respectively, by translating the signal developed in the output circuit of the limiter 71 through the phase-delay circuits 74b and 74c, respectively.

The gating circuits 70a, 70b, and 70c are normally nonconductive so that none of the signals applied thereto from the the terminals 12,12 is translated there through for application to the input circuits of the units 17a–17c, inclusive. Upon application of the signals represented by curves B–D, inclusive, the gating circuits 70a–70c, inclusive, and, respectively, successively become conductive. Thus, the gating circuit 70a becomes conductive during the time $t_1$–$t_3$, and effects representative of the intercepted signals applied to the terminals 12,12 are stored in the unit 17a during this time. Similarly, effects representative of the intercepted signals are stored in the units 17b and 17c during the times $t_2$–$t_4$, and $t_3$–$t_5$, respectively. It is apparent that the application and termination of the intercepted signals to the different storage apparatus is gradually effected by means of the control of the gating circuits 70a–70c, inclusive, through the utilization of control signals such as are represented by curves B–D, inclusive. Therefore the aperture problems and their effects on the intercepted and stored signal information are substantially reduced.

The gating signals represented by curves B–D, inclusive, are also applied to pulse-forming networks to develop control pulses which are then utilized to control conventional line-frequency and field-frequency generators to effect deflection of one of the electron beams in each of the apparatus 17a–17c, inclusive. Thus, the gating signal applied to the unit 70a is also applied to the pulse-forming network 72a to form a pulse which is then applied to the deflection control network 73a to develop field-frequency and line-frequency signals which are applied to the deflection windings of the unit 17a through the terminals 36a and 37a, respectively.

As just described, the storing of information representative of intercepted signals is performed in such manner as to have some overlapping in the operation of the different storage units. This overlapping is apparent from an examination of curves B–D, inclusive, representing the storage time for the units 70a–70c, inclusive. The resolving time for each of the units is proportioned to be only one-half of the storage time since rectilinear apertures may be employed in the resolving circuits without undesired effects and in order that no overlapping in the resolution of the stored signals occurs. The manner of developing these rectilinear apertures will be described more fully hereinafter. Since the total resolving time is, therefore, approximately one-half the total storage time, in order to obtain the same resolution as previously discussed with reference to the system of FIG. 1, the ratio of the frequency of field scanning in the resolving unit to the frequency of field scanning in the storing unit should be double the ratio in the system of FIG. 1.

The signal developed in the sine-wave generator 318 is inverted in phase in the unit 75 and an amplitude portion thereof translated through the limiter 76. This amplitude portion is represented by curve E of FIG. 4 and is related to the portion of the original sine-wave signal represented by the portion of curve A which is below the reference line L. The signal represented by curve E is formed in the network 77a into a rectilinear pulse such as represented by curve F and the latter signal is utilized to control the initiation and termination of the line-frequency and field-frequency signals in the unit 79a. For reasons stated previously with respect to FIG. 1, the line-frequency and field-frequency signals applied to the unit 17a through the terminals 38a and 39a are of much higher frequency than the related signals applied to the same unit through the terminals 36a and 37a. The pulse represented by curve F is also utilized to control the bias on the cathode 54a to effect conduction between the cathode 54a and the anode in the unit 17a only during the occurrence of the applied pulse. The signals developed in the output circuit of the unit 17a during this period are translated through the amplifier 81a and applied through the terminals 35,35 to apparatus such as is coupled to the corresponding terminals of FIG. 1.

The signal represented by curve E is delayed in the time-delay network 78b by the period of time $t_4$ minus $t_3$ and becomes a signal such as is represented by curve G, the latter signal being formed into a pulse as represented by curve H in a manner similar to that previously explained herein. Similarly, a signal such as is represented by Curve I is applied to the pulse-forming network 77c and is developed into a pulse such as is represented by curve J.

It is apparent that the timing of the pulses represented by curves F, H, and J is such as to cause the signal-deriving devices in the units 17a, 17b, and 17c to be operative during the periods when the storing devices of these units are dormant. For example, the storage device of the unit 17a is dormant between the times $t_3$–$t_4$. During the same time, the deriving device in the unit 17a is operative as indicated by the occurrence at this time of the pulse represented by curve F. It is also apparent that there is no overlapping in time of the pulses represented by curves F, H, and J, and that the signals stored in the units 17a–17c, inclusive, are resolved in a sequential manner in accordance with the time relationships of these pulses.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A spectrum-analyzing system comprising:
   a circuit for supplying the signals in a predetermined frequency spectrum; a plurality of signal-storage devices;
   means for causing said devices individually to be responsive to said supplied signals during different groups of recurrent intervals having durations longer than the interludes therebetween for individually storing effects representative of those of said supplied signals occurring during different ones of said groups of intervals, said groups of intervals being staggered in time and partially overlapping to diminish aperture distortion in the storing of said effects; a signal-deriving apparatus coupled to said storage devices; means for causing said deriving apparatus to be sequentially responsive to said stored effects at times corresponding to said interludes for deriving during each interlude from the effects stored in one of said intervals and at a rate higher than the storing rate thereof a plurality of groups of signals, each derived group being representative of those of said supplied signals occurring during said one interval; and signal-selecting means coupled to said deriving device and including a network having a pass band narrow relative to the frequency range of each of said groups of derived signals for sequentially developing signals each having the frequency limits of said network and individually representative of different frequency bands of said groups of derived signals.

2. A spectrum-analyzing system comprising: a circuit having a pass band $W$ cycles in width for supplying the signals in a predetermined frequency spectrum; a plurality of signal-storage devices; means for causing said in width and individually representative of different frequency bands of said groups of derived signals, thereby effectively to select the signals in $c$ frequency bands of said supplied signals.

3. A spectrum-analyzing system comprising: a circuit for supplying the signals in a predetermined frequency spectrum; a plurality of signal-storage devices; means for causing said devices individually to be responsive to said supplied signals during different groups of recurrent intervals having durations twice as long as the interludes therebetween for individually storing effects representative of those of said supplied signals occurring during different ones of said groups of intervals, said groups of intervals being staggered in time and pairs thereof partially overlapping to diminish aperture distortion in the storing of said effects; a signal-deriving apparatus coupled to said storage devices; means for causing said deriving apparatus to be sequentially responsive to said stored effects at times corresponding to said interludes for deriving during each interlude from the effects stored in one of said intervals and at a rate higher than the storing rate thereof a plurality of groups of signals, each derived group being representative of those of said supplied signals occurring during said one interval; and signal-selecting means coupled to said deriving device and including a network having a pass band narrow relative to the frequency range of each of said groups of derived signals for sequentially developing signals each having the frequency limits of said network and individually representative of different frequency bands of said groups of derived signals.

4. A spectrum-analyzing system comprising: a circuit having a pass band $W$ cycles in width for supplying the signals in a predetermined frequency spectrum; a plurality of signal-storage devices; means for causing said devices individually to be responsive to said supplied signals during different groups of recurrent intervals having durations longer than the interludes therebetween for individually storing effects representative of those of said supplied signals occurring during different ones of said groups of intervals, said groups of intervals being staggered in time and partially overlapping to diminish aperture distortion in the storing of said effects; a signal-deriving apparatus coupled to said storage devices; means for causing said deriving apparatus to be sequentially responsive to said stored effects at times corresponding to said interludes for deriving during each interlude from the effects stored in one of said intervals and at a rate higher than the storing rate thereof a plurality of groups of signals, each derived group being representative of those of said supplied signals occurring during said one interval; and signal-selecting means coupled to said deriving device and including a network having a pass band substantially $W$ cycles in width and narrow relative to the frequency range of each of said groups of derived signals for sequentially developing signals each having the frequency limits of said network and individually representative of different frequency bands of said groups of derived signals.

5. A spectrum-analyzing system comprising: a circuit for supplying the signals in a predetermined frequency spectrum; a plurality of signal-storage devices; means for causing said devices individually to be responsive to said supplied signals during different groups of recurrent intervals having durations longer than the interludes therebetween for individually storing effects representative of those of said supplied signals occurring during different ones of said groups of intervals, said groups of intervals being staggered in time and partially overlapping to diminish aperture distortion in the storing of said effects; a signal-deriving apparatus coupled to said storage devices; means for causing said deriving apparatus to be sequentially responsive to said stored effects at times corresponding to said interludes for deriving during each interlude from the effects stored in one of said intervals and at a rate higher than the storing rate thereof a plurality of groups of signals, each derived group being representative of those of said supplied signals occurring during said one interval; and signal-selecting means coupled to said deriving device and including an oscillator for developing a signal which varies in frequency between predetermined limits, a modulator responsive to said developed and derived signals for developing a beat-frequency signal and a network having a pass band narrow relative to the frequency range of each of said groups of derived signals and responsive to said beat-frequency signal for sequentially translating signals each having the frequency limits of said network and individually representative of different frequency bands of said groups of derived signals.

6. A spectrum-analyzing system comprising: a circuit having a pass band $W$ cycles in width for supplying the signals in a predetermined frequency spectrum; a plurality of signal-storage devices; means for causing said devices individually to be responsive to said supplied signals during different groups of recurrent intervals having durations longer than the interludes therebetween for individually storing effects representative of those of said supplied signals occurring during different ones of said groups of intervals, said groups of intervals being staggered in time and partially overlapping to diminish aperture distortion in the storing of said effects; a signal-deriving apparatus coupled to said storage devices; means for causing said deriving during each interlude from the effects stored in one of said intervals and at a rate $c$ higher than the storing rate thereof a plurality of groups of signals, each derived group being representative of those of said supplied signals occurring during said one interval and having a frequency range $cW$ cycles, where $c$ is a constant greater than one; and signal-selecting means coupled to said deriving device and including an oscillator for developing a signal which varies in frequency over said range $cW$ cycles, a modulator responsive to said developed and derived signals for developing a beat-frequency signal and a network having a pass band $W$ cycles in width and narrow relative to the frequency range of each of said groups of derived signals and responsive to said beat-frequency signal for sequentially translating signals each $W$ cycles in width and individually representative of different frequency bands of said groups of derived signals, thereby effectively to select the signals in $c$ frequency bands of said supplied signals.

7. A spectrum-analyzing system comprising: a circuit for supplying the signals in a predetermined frequency spectrum; a plurality of cathode-ray tube signal-storage devices each having a pair of electron guns and an anode; biasing means coupled to one of said electron guns in each of said tubes for causing said devices individually to be responsive to said supplied signals during different groups of recurrent intervals having durations longer than the interludes therebetween for individually storing effects on said anodes representative of those of said supplied signals occurring during different ones of said groups of intervals, said groups of intervals being staggered in time and partially overlapping to diminish aperture distortion in the storing of said effects; a signal-deriving apparatus coupled to said other one of said electron guns in each of said tubes; means for controlling the coupling of said deriving apparatus to said other guns so that said apparatus is sequentially responsive to said stored effects on said anodes at times corresponding to said interludes for deriving during each interlude from the effects stored in one of said intervals and at a rate higher than the storing rate thereof a plurality of groups of signals, each derived group being representative of those of said supplied signals occurring during said one interval; and signal-selecting means coupled to said deriving device and including a network having a pass band narrow relative to the frequency range of each of said groups of derived signals for sequentially developing signals each having the frequency limits of said network and individually representative of different frequency bands of said groups of derived signals.

* * * * *

UNITED STATES PATENT OFFICE
CERTIFICATE OF CORRECTION

Patent No. 3,617,883            Dated November 2, 1971

Inventor(s) Donald Richman

It is certified that error appears in the above-identified patent and that said Letters Patent are hereby corrected as shown below:

Column 13, line 22, cancel "in width and" and insert -- devices individually to be responsive to said supplied signals during different groups of recurrent intervals having durations longer than the interludes therebetween for individually storing effects representative of those of said supplied signals occurring during different ones of said groups of intervals, said groups of intervals being staggered in time and partially overlapping to diminish aperture distortion in the storing of said effects; a signal-deriving apparatus coupled to said storage devices; means for causing said deriving apparatus to be sequentially responsive to said stored effects at times corresponding to said interludes for deriving during each interlude from the effects stored in one of said intervals and at a rate $c$ higher than the storing rate thereof a plurality of groups of signals, each derived group being representative of those of said supplied signals occurring during said one interval and having a frequency range $cW$ cycles, where $c$ is a constant greater than one; and signal-selecting means coupled to said deriving device and

UNITED STATES PATENT OFFICE
CERTIFICATE OF CORRECTION

Patent No. 3,617,883  Dated November 2, 1971

Inventor(s) Donald Richman  PAGE - 2

It is certified that error appears in the above-identified patent and that said Letters Patent are hereby corrected as shown below:

including a network having a pass band $\underline{W}$ cycles in width and narrow relative to the frequency range of each of said groups of derived signals for sequentially developing $\underline{c}$ signals each having the frequency limits of said network --

Column 14, claim 6, line 42, after "deriving" insert -- apparatus to be sequentially responsive to said stored effects at times corresponding to said interludes for deriving --.

Signed and sealed this 10th day of October 1972.

(SEAL)
Attest:

EDWARD M. FLETCHER, JR.
Attesting Officer

ROBERT GOTTSCHALK
Commissioner of Patents